United States Patent [19]  
Appel et al.

[11] 4,062,275  
[45] Dec. 13, 1977

[54] GRILL APPLIANCE

[75] Inventors: Wolfgang Appel, Munich; Otto Bjarsch, Traunreut; Horst Heimdörfer, Traunreut, all of Germany

[73] Assignee: Bosch-Siemens Hausgerate GmbH, Munich, Germany

[21] Appl. No.: 632,693

[22] Filed: Nov. 17, 1975

[30] Foreign Application Priority Data

Nov. 21, 1974 Germany .............................. 2455190

[51] Int. Cl.² ............................................ A47J 37/04
[52] U.S. Cl. ........................................ 99/393; 99/400; 99/401; 99/446; 99/443 R; 219/347; 219/348; 219/385
[58] Field of Search ................ 99/385, 393, 400, 401, 99/447, 446, 391, 392, 423, 443 R; 219/354, 214, 347, 348, 385, 386, 388

[56] References Cited

U.S. PATENT DOCUMENTS

| 2,247,974 | 7/1941 | Thimblethorpe | 99/393 |
| 2,255,466 | 9/1941 | Jenkins | 99/385 |
| 2,386,426 | 10/1945 | Brannon | 99/393 X |
| 2,556,808 | 6/1951 | Harris | 99/423 |
| 2,631,216 | 3/1953 | Ames | 219/342 X |
| 3,319,062 | 5/1967 | Falk | 219/347 |

FOREIGN PATENT DOCUMENTS 338,573  7/1959  Switzerland .......................... 99/443

Primary Examiner—Billy J. Wilhite  
Attorney, Agent, or Firm—Herbert L. Lerner

[57] ABSTRACT

Grill appliance which has a central vertical column supporting at the top a cover with grill heater beneath it and disposed beneath and at a distance below the grill heater is a grill carrier around the central column. This permits ready access to the article to be grilled on the grill carrier. Provision is also made for convenient removal and attachment of the cover and heater and grill carrier as well as adjustment of the distance between the heater and carrier. Framework for disposing a removable reflecting foil is provided.

10 Claims, 7 Drawing Figures

GRILL APPLIANCE

BACKGROUND OF THE INVENTION

1. Field of the Invention

This invention relates to a grill appliance and more particularly refers to a new and improved broiler with a grid having a grill heater arranged under a cover and a carrier for the articles to be grilled arranged at a distance underneath the former.

2. Description of the Prior Art

Known grill appliances of this type have at least one side wall connecting the carrier for the articles to be grilled with the grill heaters. As a result, they are not accessible from all sides.

SUMMARY OF THE INVENTION

An object of the present invention is to provide a grill appliance which is accessible from all sides. Another object is to provide a grill appliance in which the primary elements are easily removed and assembled to facilitate cleaning and repairs. A further object is to provide simple adjustment and convenient handling of the grill appliance. The grill appliance in accordance with the present invention comprises a grill heater, a cover above said grill heater, a grill carrier for the article to be grilled disposed beneath and at a distance below said grill heater, and a central column supporting said cover and said lower grill carrier to permit ready access from all sides to the article to be grilled on said grill carrier.

The carrier for the articles to be grilled is connected with the cover and the grill heater arranged underneath via a central column. Preferably, the central column is brought through the carrier for the articles to be grilled, and has at its lower end a base which supports the grill appliance. In this construction, the carrier for the articles to be grilled is supported at a distance above the support surface, e.g. a table. This has the advantage that the heat transfer to the support surface is small and the appliance can also be placed on a set table.

It is advantageous to provide a support element for the carrier for the articles to be grilled, which surrounds the central column and may be rotatable about the latter, so that it can interact with helical tracks or inclined surfaces formed at the central column. The carrier for the articles to be grilled can in this manner be adjusted in height relative to the grill heater.

In a preferred embodiment the support element engages the helical tracks by means of radially inward-directed guide projections.

The helical tracks may have landings at different heights, so that the carrier for the articles to be grilled stays at these heights. Above the landings of the helical tracks, lifting projections can be formed at the central column, which cooperate with the guide projections of the support element if the latter is lifted vertically, and thereby cause the entire equipment to be lifted. Thus, heat-insulated handles arranged at the support element can be used for setting the height of the carrier for the articles to be grilled as well as for lifting the equipment when it is hot.

To avoid rotating the carrier with the articles to be grilled when the support element is rotated, the former can be secured against rotation by means of projections engaging with vertical guides of the central column.

The grill heater is preferably connected with the central column via a plug connection so that it can be removed from the central column, and thereby also permitting the carrier for the articles to be grilled to be pulled off in an upward direction from the central column for cleaning. As an alternative, however, the grease tray may also be designed in the form of two semicircular dishes which partially overlap in the assembled condition and can be removed sideways from the central column.

Other features which are considered as characteristic for the invention are set forth in the appended claims.

Although the invention is illustrated and described herein as embodied in the grill appliance, it is nevertheless not intended to to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 4:
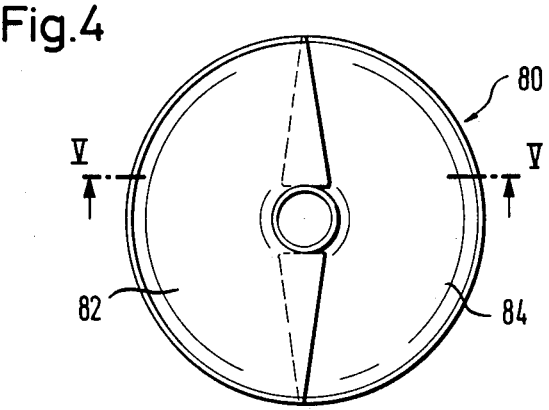
Figure 5:
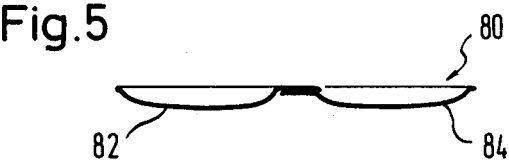

FIG. 4 in a top view, shows a modified embodiment of a grease tray designed as the carrier for the articles to be grilled;

FIG. 5 is a cross section along the line V—V in FIG. 4; and

Figure 6:
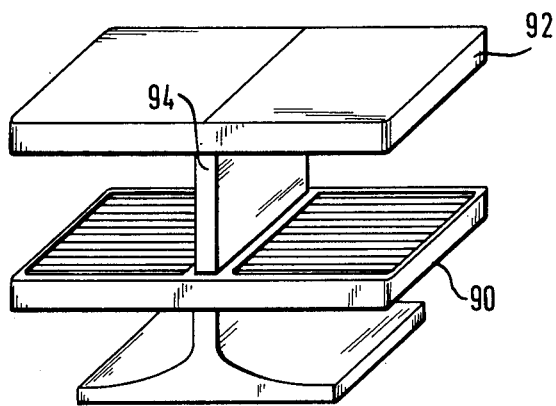

FIG. 6 shows a modified embodiment of the grill appliance according to the invention.

Figure 7:
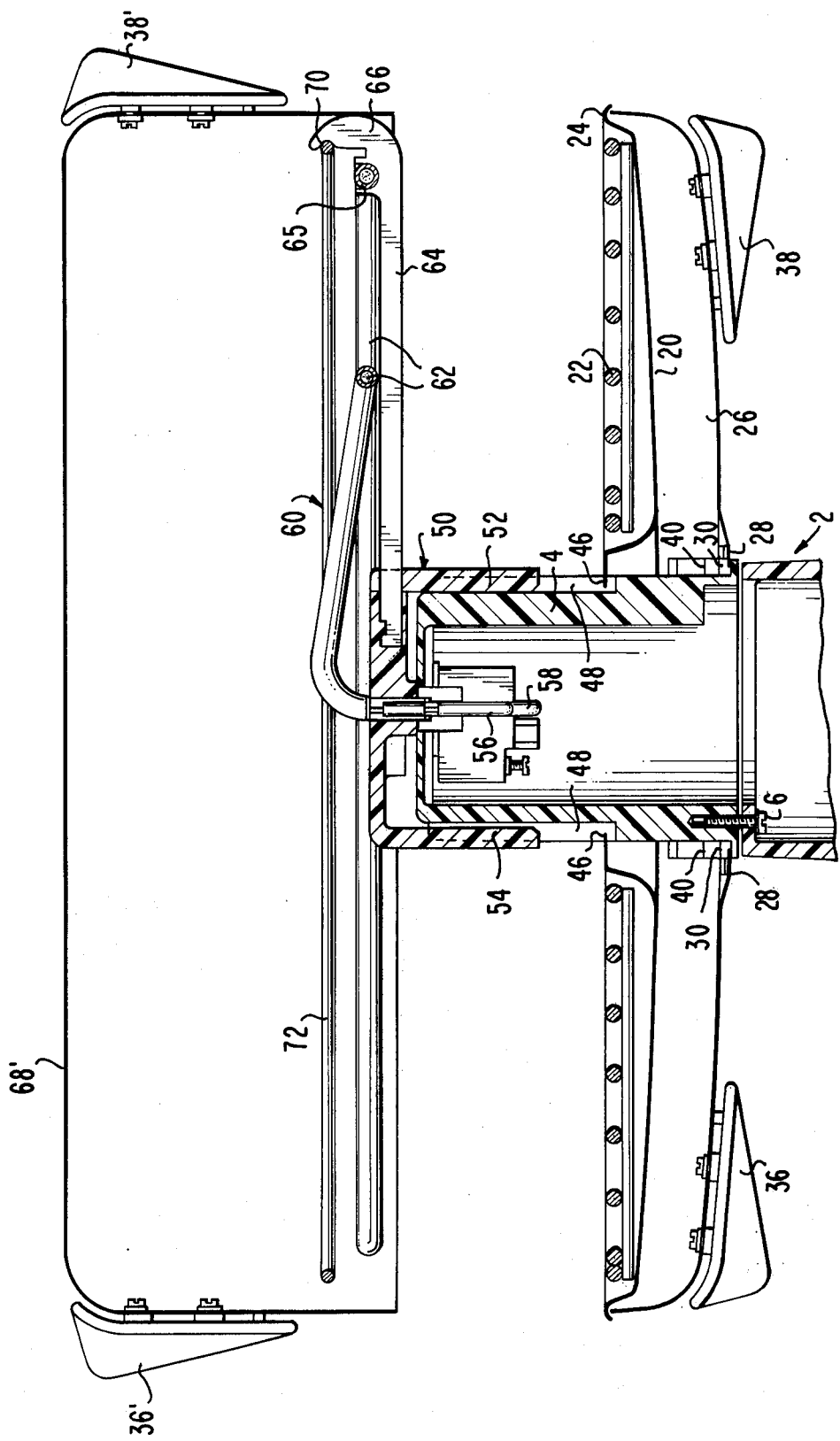

FIG. 7 shows a modified embodiment of the grill appliance with a high dome-like hood for use as a baking hood.

DETAILED DESCRIPTION

Figure 1:
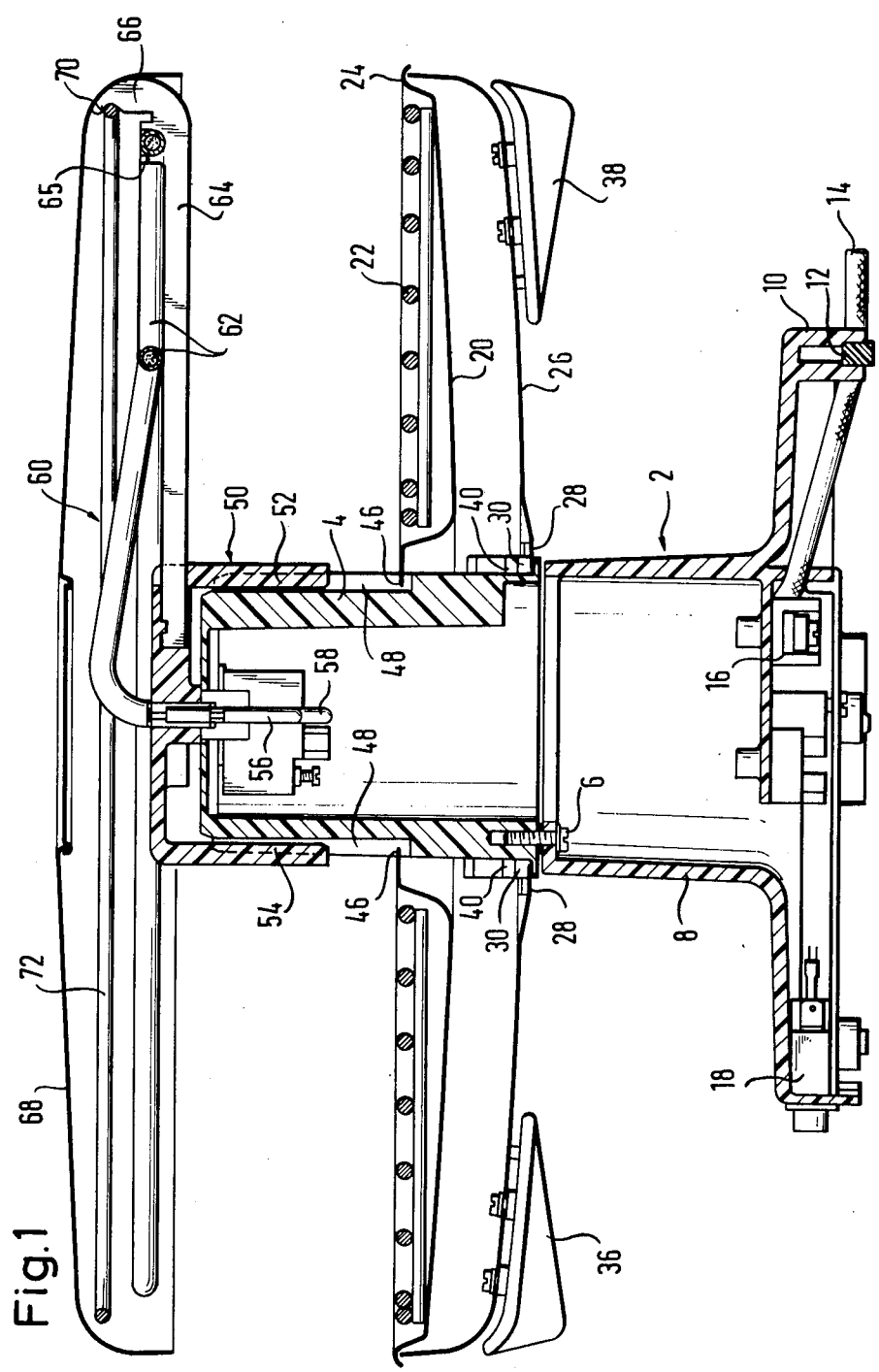
FIG. 1 shows a vertical longitudinal cross section through the grill appliance in accordance with the invention along the line I—I in FIG. 2.
Figure 2:
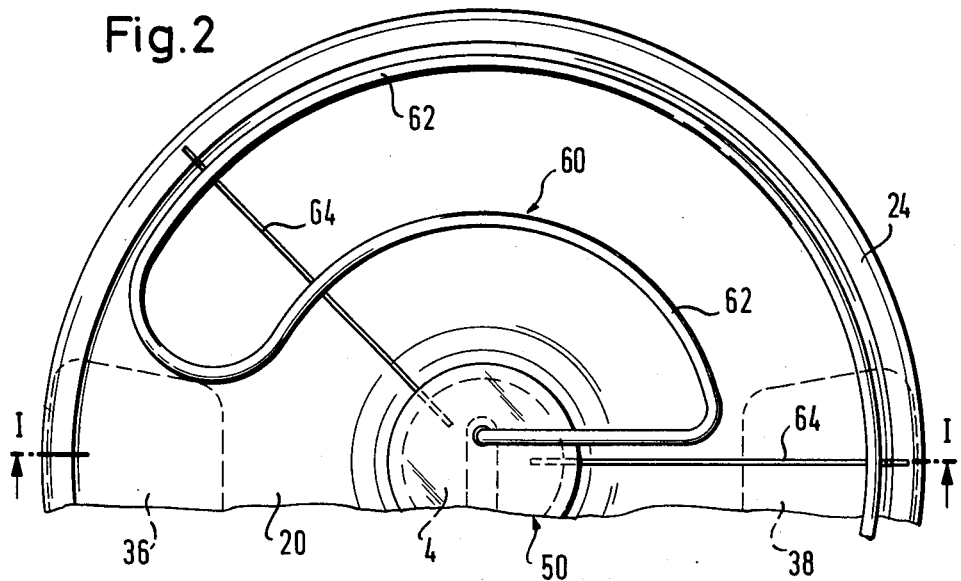
FIG. 2 is a partial section of a top view of the grill appliance shown in FIG. 1, with the cover removed.
Figure 3:
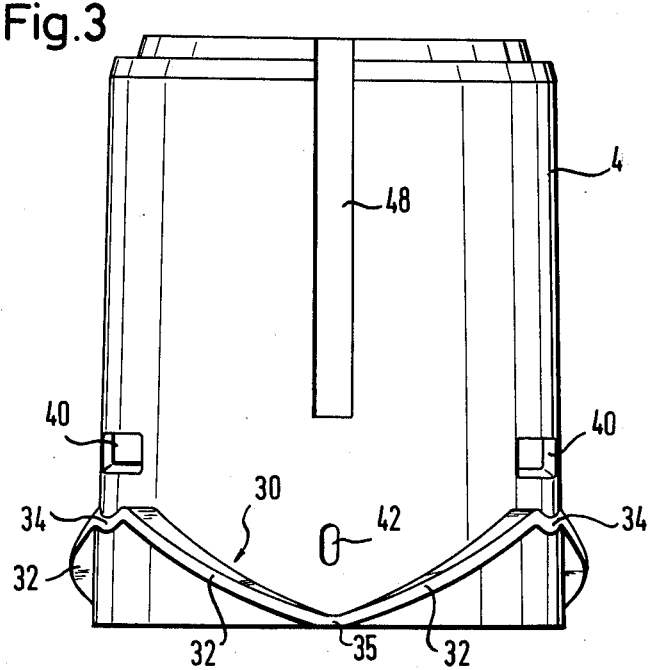
FIG. 3 shows part of the central column with the helical tracks for setting the height of the carrier for the articles to be grilled.

The grill appliance shown in FIGS. 1 to 3 comprises a vertical central column 2 with an upper column part 4 of metal or ceramic and a lower column part 8, connected with the former by means of screws 6, of heat-resistant plastic or ceramic material. Central column 2 has substantially cylindrical shape and lower column part 8 has a rotation-symmetrical base 10 with feet 12 of nonskid material.

A power cord 14 is brought laterally through the base 10 and is connected to conventional terminals 16, not described in detail. In base 10 is mounted an on-off switch 18 for the electric power.

As the carrier for the articles to be grilled, a grid or gridiron 22 supported by a grease tray 20 is provided around the upper column part 4. The grease tray 20 hangs with its outer rim 24 in a dish-shaped support element 26 which latter has radially inward-directed guide projections 28 which interact with the helical tracks 30 formed at the upper column part 4.

As best be seen from FIG. 3, the helical tracks 30 have adjoining rising and falling track elements 32, which form a roller coaster track leading around upper column 4. Support element 26 preferably consisting of a heat-resistant, heat-insulating plastic material has fastened thereon at its underside two spaced handles 36 and 38. Support element 26 can be rotated by means of these handles with guide projections 28 sliding on roller coaster track 32 and thereby adjusting in height support element 26 with grease tray 20 and carrier 22 for the articles to be grilled. Roller coaster track 32 has at its highest points depressions 34, in which guide projections 28 rest in the top position of support element 26. In the low position of support element 26, guide projections 28 rest in the valley between the rising flanks 32. Above the valley and top points of the roller coaster track are radially outward-extending lifting projections 40 and 42 against which guide projections 28 of support element 26, which are shaped with a slight depression, come to rest if the grill appliance is lifted by handles 36 and 38 of the support element. Handles 36 and 38 thus serve not only for adjusting the height of the carrier for the articles to be grilled relative to the grill heater, but also for carrying the appliance.

To prevent grill gridiron 22, which serves as the carrier for the articles to be grilled, from rotating along with support element 26 when its height is adjusted by turning to a different point relative to the central column, grease tray 20 has at its central opening, through which the upper column part 4 extends, two radially inward-directed rotation-prevention projections 46, which engage with guide slots 48 shown in FIG. 3, which are formed in the upper column part 4 and are open toward the top. A cap-shaped plug 50 is placed onto the upper end of central column 2 or the upper column part 4 to engage internal guide ribs 54 of the cap with slots 48 which are formed at upper column part 4. Cap 50 is first placed so that its guide ribs 54 come into contact with upper column part 4. The cap is then turned until ribs 54 are in engagement with guide slots 48, at this position contact pins 56 and 58 which are arranged in the cap, also come into engagement with corresponding contact elements in the upper column part 4. From contact pins 56 and 58 electric current leads to grill heater 60, which consists of a tubular heater element 62. Firmly connected to cap 50 are three brackets 64 which extend radially outward about as far as the carrier 22 for the articles to be grilled and have on their top side cutouts 65, into which an outer turn of the grill heater element 62 is placed. Brackets 64 have at their outer ends upward-pointing extensions 66, on which a lid 68 which has the shape of an inverted dish and forms the cover for the appliance, rests loosely. Extensions 66 have on their inside cutouts 70, into which a circular wire ring 72 can snap if the cover 68 is removed. This ring may be covered with replaceable aluminum foil, which serves on the one hand as a reflector for the grill heater and on the other hand, as disposable splatter protection, to prevent the underside of the cover from becoming dirty.

FIGS. 4 and 5 illustrate a modified embodiment of the grill appliance with a divided grease tray 80 which consists of two approximately semicircular half-trays 82 and 84 which are placed laterally and which overlap partially and which grease tray 80 can be substituted for grease tray 20 shown in FIG. 1.

FIG. 6 shows a modified embodiment of the grill appliance, in which the carrier 90 for the articles to be grilled and the lid 92 with the grill heater arranged underneath, not shown, are of approximately rectangular design and are connected with each other by a flat central column 94, so that the carrier 90 for the articles to be grilled and the cover 92 with the grill heater do not extend completely around the central column 94 but are arranged only on two sides of the central column. In the simplified form shown in FIG. 6, the carrier 90 is in fixed position. In this equipment, too, the carriers for the articles to be grilled are accessible from all sides, so that it can stand in the center of a party like a fondue set and can be loaded with food to be grilled from all sides.

Deviating from the shallow embodiment shown in the drawing, the lid can also be made deep, the grill heater being arranged as before adjacent to its wall. A lid of such design can serve as a baking hood, in that it is lowered completely onto the carrier for the articles to be grilled, which in this case serves as the carrier for the articles to be baked.

FIG. 7 illustrates this modification wherein the grill heater as shown in FIG. 1 except for the lid 68, has a high dome-like hood 68' which may be provided with conventional handles 36' and 38' similar to handles 36 and 38, to aid in lowering and raising hood 68' when hot. The hood 68' when lowered rests on the outermost portion of the carrier for the grill heater.

There is claimed:

1. A grill appliance comprising a vertical central column grill heater for grilling an article, disposed adjacent the upper end of said vertical central column with said heater extending horizontally about said central column, a cover above said grill heater, a base at the lower end of said vertical central column and extending horizontally about said central column for standing said grill appliance on a support surface, a grill carrier for the article to be grilled extending horizontally about said central column and disposed between said grill heater and said base with said central column extending through said grill carrier, and a support element for said grill carrier for the articles to be grilled, surrounding and supported by said cenrral column, thereby permitting ready access from all sides to the article to be grilled on said grill carrier, therebeing inclined surfaces formed on the central column wherein said support element can be rotated about said column on said surfaces to permit adjustment in height of said grill carrier for the articles to be grilled relative to said grill heater.

2. Grill appliance according to claim 1 wherein said support element has radially inward-directed guide projections which slide on said inclined surfaces of the central column.

3. Grill appliance according to claim 2 wherein said inclined surfaces formed at the central column have landings at different heights.

4. Grill appliance according to claim 3 wherein lifting projections are formed at the central column above said landings of said inclined surfaces, with said guide projections of support element engaging said lifting projections when said support element is lifted vertically and thus lifting the grill appliance up.

5. A grill appliance comprising a vertical central column grill heater for grilling an article, disposed adjacent the upper end of said vertical central column with said heater extending horizontally about said central column, a cover above said grill heater, a base at the lower end of said vertical central column and extending horizontally about said central column for standing said grill appliance on a support surface, a grill carrier for the article to be grilled extending horizontally about said central column and disposed between said grill heater and said base with said central column extending through said grill carrier, said central column having vertical guides thereon and said grill carrier having projections thereon cooperating with said guides whereby said grill carrier is secured against rotation relative to central column, and a support element for said grill carrier for the articles to be grilled, surrounding and supported by said central column, thereby permitting ready access from all sides to the article to be grilled on said grill carrier.

6. A grill appliance comprising a vertical central column grill heater for grilling an article, disposed adjacent the upper end of said vertical central column with said heater extending horizontally about said central column, a cover above said grill heater, a base at the lower end of said vertical central column and extending horizontally about said central column for standing said grill appliance on a support surface, a grill carrier for the article to be grilled extending horizontally about said central column and disposed between said grill heater and said base with said central column extending through said grill carrier, said grill carrier for the articles to be grilled having a grease tray extending horizontally about said central column, said grease tray supporting a grid disposed above said grease tray, and a support element for said grill carrier for the articles to be grilled, surrounding and supported by said central column, thereby permitting ready access from all sides to the article to be grilled on said grill carrier.

7. A grill appliance comprising a vertical central column grill heater for grilling an article, disposed adjacent the upper end of said vertical central column with said heater extending horizontally about said central column, a cover above said grill heater, a base at the lower end of said vertical central column and extending horizontally about said central column for standing said grill appliance on a support surface, a grill carrier for the article to be grilled extending horizontally about said central column and disposed between said grill heater and said base with said central column extending through said grill carrier, and a support element for said grill carrier for the articles to be grilled, surrounding and supported by said central column, thereby permitting ready access from all sides to the article to be grilled on said grill carrier, and wherein said grill heater beneath said cover is connected by a removable plug connection onto the upper end of said central column to permit removal of said cover and said grill heater and also removal of said grill carrier by lifting it off said central column.

8. Grill appliance according to claim 7 wherein electric current to said grill heater is supplied through electrical conductors up through said central column to electric terminals of said plug connection for contact with terminals of said grill heater.

9. A grill appliance comprising a vertical central column grill heater for grilling an article, disposed adjacent the upper end of said vertical central column with said heater extending horizontally about said central column, a cover above said grill heater, a base at the lower end of said vertical central column and extending horizontally about said central column for standing said grill appliance on a support surface, a grill carrier for the article to be grilled extending horizontally about said central column and disposed between said grill heater and said base with said central column extending through said grill carrier, said grill carrier for the article to be grilled having a grease tray and said grease tray is composed of two semicircular dish parts which are placed against the central column from the side and which partially overlap, and a support element for said grill carrier for the articles to be grilled, surrounding and supported by said central column, thereby permitting ready access from all sides to the article to be grilled on said grill carrier.

10. A grill appliance comprising a vertical central column grill heater for grilling an article, disposed adjacent the upper end of said vertical central column with said heater extending horizontally about said central column, a cover above said grill heater, a base at the lower end of said vertical central column and extending horizontally about said central column for standing said grill appliance on a support surface, a grill carrier for the article to be grilled extending horizontally about said central column and disposed between said grill heater and said base with said central column extending through said grill carrier, said cover having a high dome-like hood which can serve as a baking hood when lowered onto said grill carrier, and a support element for said grill carrier for the articles to be grilled, surrounding by said central column, thereby permitting ready access from all sides to the article to be grilled on said grill carrier.

* * * * *